US010554490B2

(12) United States Patent
Gates et al.

(10) Patent No.: US 10,554,490 B2
(45) Date of Patent: *Feb. 4, 2020

(54) CONFIGURING A SINGLE USER WIRELESS NETWORK

(71) Applicant: Riverbed Technology, Inc., San Francisco, CA (US)

(72) Inventors: Dirk Gates, Westlake Village, CA (US); Patrick Parker, Moorpark, CA (US); Jack Horner, Thousand Oaks, CA (US); Alan Russell, Lubbock, TX (US)

(73) Assignee: Cambium Networks, Ltd., Ashburton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,428

(22) Filed: Jul. 9, 2018

(65) Prior Publication Data

US 2018/0331899 A1  Nov. 15, 2018

Related U.S. Application Data

(63) Continuation of application No. 15/416,243, filed on Jan. 26, 2017, now Pat. No. 10,044,560, which is a
(Continued)

(51) Int. Cl.
| | |
|---|---|
| *H04L 12/24* | (2006.01) |
| *H04W 12/06* | (2009.01) |
| *G06Q 10/02* | (2012.01) |
| *H04W 28/26* | (2009.01) |
| *H04W 88/08* | (2009.01) |
| *H04W 76/10* | (2018.01) |

(Continued)

(52) U.S. Cl.
CPC ........ *H04L 41/0806* (2013.01); *G06Q 10/02* (2013.01); *H04W 12/06* (2013.01); *H04W 16/20* (2013.01); *H04W 28/26* (2013.01); *H04W 76/10* (2018.02); *H04W 88/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,298,702 B1 | 11/2007 | Jones et al. | |
| 8,494,576 B1 * | 7/2013 | Bye | ................... G07C 9/00087 455/550.1 |

(Continued)

*Primary Examiner* — Saba Tsegaye
(74) *Attorney, Agent, or Firm* — SoCal IP Law Group LLP; John E. Gunther; Steven C. Sereboff

(57) ABSTRACT

There is disclosed a method for managing a communications system including a wireless network access point and an administrator computing device coupled to the access point via a network. A user device connects to a basic service set hosted by the access point. The administrator computing device accepts a request to configure a single-user service set hosted by the access point, the request received from the user device via the basic service set and the network. The administrator computing device instructs the access point to configure the private single-user service set using configuration information contained in the request. The access point configures the single-user service set using the configuration information.

20 Claims, 9 Drawing Sheets

Related U.S. Application Data continuation of application No. 14/717,946, filed on May 20, 2015, now Pat. No. 9,591,529.

(51) Int. Cl.
*H04W 16/20* (2009.01)
*H04W 84/12* (2009.01)

(56) References Cited

U.S. PATENT DOCUMENTS

| | | |
|---|---|---|
| 8,498,278 B2 | 7/2013 | Beach |
| 8,537,716 B2 | 9/2013 | Gudipudi |
| 8,885,539 B2 | 11/2014 | Trudeau et al. |
| 8,923,265 B2 | 12/2014 | Kuo et al. |
| 2004/0185845 A1 | 9/2004 | Abhishek et al. |
| 2005/0185626 A1 | 8/2005 | Meier et al. |
| 2007/0089110 A1 | 4/2007 | Li |
| 2008/0293404 A1 | 11/2008 | Scherzer et al. |
| 2011/0173682 A1* | 7/2011 | Perry .................... H04W 12/06 726/4 |
| 2012/0064895 A1 | 3/2012 | Zhang |
| 2012/0209934 A1 | 8/2012 | Smedman |
| 2013/0170432 A1 | 7/2013 | O'Brien et al. |
| 2013/0333016 A1 | 12/2013 | Coughlin |
| 2014/0196126 A1 | 7/2014 | Peterson et al. |
| 2015/0208242 A1 | 7/2015 | Ji |
| 2015/0382196 A1 | 12/2015 | Hillier |
| 2016/0323689 A1* | 11/2016 | Goluboff ............. H04L 63/0823 |
| 2018/0241626 A1* | 8/2018 | Kumar .................. H04L 41/082 |

* cited by examiner

CONFIGURING A SINGLE USER WIRELESS NETWORK

RELATED APPLICATION INFORMATION

This patent is a continuation of application Ser. No. 15/416,243, titled PRECONFIGURED SINGLE USER WIRELESS NETWORKS, filed Jan. 26, 2017, U.S. Pat. No. 10,044,560,which is a continuation of application Ser. No. 14/717,946, titled ACCESS POINT PROVIDING MULTIPLE SINGLE-USER WIRELESS NETWORKS, filed May 20, 2015, now U.S. Pat. No. 9,591,529.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to wireless local area networks and, in particular, to wireless access points that support multiple single-user local area networks.

Description of the Related Art

Current wireless local area networks (LANs) commonly adhere to the Wi-Fi™ industry standard which is based on the Institute of Electrical and Electronics Engineers' (IEEE) 802.11 standards. The fundamental building block of an 802.11 LAN is a basic service set (BSS) comprising two or more "stations" or user devices in wireless communication with each other. IEEE 802.11 defines an "infrastructure mode" in which each BSS includes an "access point" that acts as a master to control the stations within that BSS. IEEE 802.11 also defines ad-hoc networks of user devices without a controlling access point and mesh networks.

As shown in FIG. 1, an infrastructure mode BSS 120 includes an access point 125 and one or more user devices which may include, for example, a smart phone 130, a tablet 132, a personal computer 134, a printer 136, and other devices. The access point 125 may be, for example, a wireless router. The access point 125 may control communications between the user devices 132-136, and may provide a path for the user devices 132-136 to communicate with a cloud 110 via a wired or wireless connection 115. In this context, the term "cloud" means a network, which may be or include the Internet, and all of the devices connected to the network.

The BSS 120 is identified by a string of 0 to 32 octets (bytes) called a service set identifier or SSID. Commonly, but not necessarily, the SSID is a human-readable text string which may be referred to as the "network name".

The BSS 120 may be configured as "public" or "private." A public BSS is not password protected. Traffic on a private BSS is controlled by a password used to derive a key to encrypt communications over the BSS. To join a private BSS, a user device must provide 125 the appropriate password to the access point.

The BSS 120 may be constrained by one or more policies enforced by the access point 125. Policies may control or constrain who is allowed access to the BSS, what type of traffic is allowed or not allowed on the BSS, and how traffic is communicated over the BSS. For example, policies may prohibit certain types of traffic within the BSS or may prohibit the BSS from accessing specific websites or types of websites within the cloud 110.

Each device, including the access point, within a BSS is identified by at least one unique media access control address (MAC address). A MAC address is a 48-bit binary number which is commonly written as six groups of two hexadecimal digits separated by colons (e.g. 00:00:00:00:00:00). Unique MAC addresses are commonly assigned by device manufacturers and are stored in hardware (for example read-only memory) within each device. In some situations, a device may be assigned a locally-controlled, not necessarily unique, MAC address that overrides the unique MAC addressed assigned by the device manufacturer. One of the 48 bits is used as a flag to indicate if the address is globally-unique or locally controlled. A second one of the 48 bits is used as a flag to indicate if the address is a unicast address or a multicast address.

All traffic with the BSS 120 is in the form of short packets which are called "frames" in the IEEE 802.11 standards. Each frame consists of a MAC header, an optional payload, and a frame check sequence. The MAC header includes a MAC address of the source device, a MAC address of the intended receiver (or receivers in the case of a multicast address), and a variety of control fields and flags. The payload length may be from 0 to 2304 bytes plus any overhead from security encapsulation. Each frame may be one of a management frame used to manage the BSS, a control frame to control traffic over the BSS, or a data frame.

The access point 125 may periodically broadcast a "beacon" control frame announcing the presence of the BSS 120. The beacon control frame includes the MAC address of the access point as the source address and a broadcast destination address. Upon receipt of the beacon frame, a user device wanting to join the BSS 120 will send an associate request frame to the MAC address of the access point. A handshake process may then be performed to verify the identity of the user device and allow the user device to join the BSS 120.

Alternatively, a user device may broadcast a request to join a particular BSS without first receiving a beacon frame from the access point for the BSS. If the client request is received by the appropriate access point, the handshake process may then ensue.

A deficiency in a typical BSS is illustrated in FIG. 2, which is a block diagram of a BSS 220 shared by two users, identified as User 1 and User 2. Sharing of a BSS by two or more users may occur in many public locations. For example, User 1 and User 2 may be different persons occupying different rooms in a hotel or dormitory, different offices in a building, different classrooms in school, or different staterooms on a cruise ship. BSS 220 includes a single access point 225, devices 232, 234, and 236 belonging to User 1, and devices 242, 244, and 246 belonging to User 2. More than two users may share a BSS, each user may have more or fewer than three devices, and each user may have different devices than those shown in FIG. 2.

The problem that may occur with a shared BSS, such as the BSS 220, is that communications between devices belonging to one user may inadvertently or maliciously be received at a device belonging to a different user. When a user device joins a private BSS using a passphrase, two types of encryption keys are exchanged between the user device and the access point. The first encryption key is the pairwise temporal key (PTK). The PTK is unique to each user device and is used by the user device and the access point for all unicast traffic during session (i.e. for all traffic destined only for that user device). The second encryption key is the group temporal key (GTK). The GTK is used by the access point for broadcast traffic. Since each BSS uses only a single GTK, broadcast traffic can be decrypted by all user devices on the BSS. There is no way to isolate broadcast traffic to a group of devices belonging to a single user. For example, if a device like an Apple TV belonging to a first user is broadcasting, every other user's devices on the BSS will receive the broadcast traffic. The only way to prevent broadcast traffic from reaching all users on a BSS is for the administrator to set the access point to block device to device traffic, which would result in no one (not even the owner of the apple TV) receiving the traffic.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
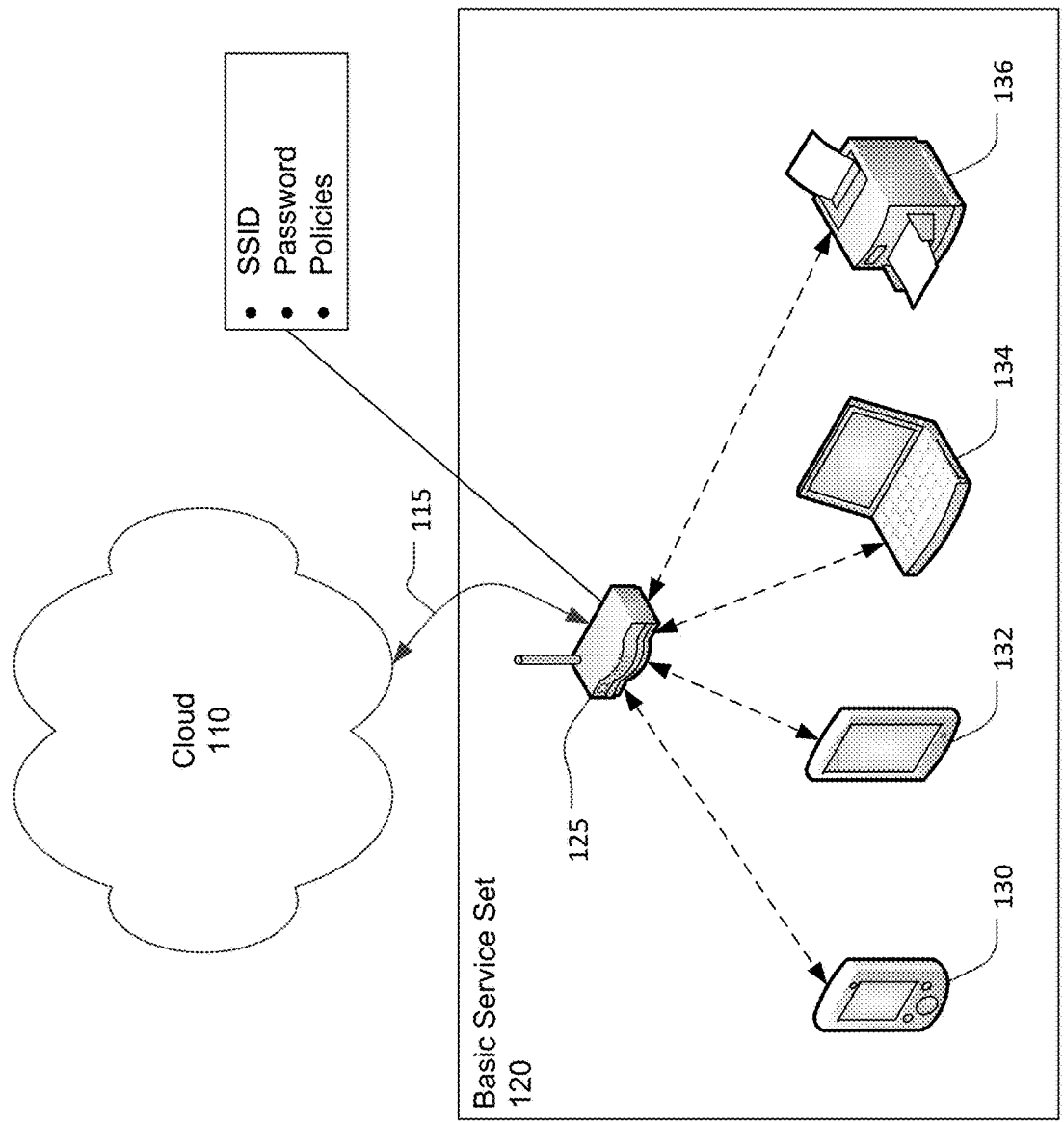
FIG. 1 is a block diagram of a wireless network Basic Service Set.
Figure 2:
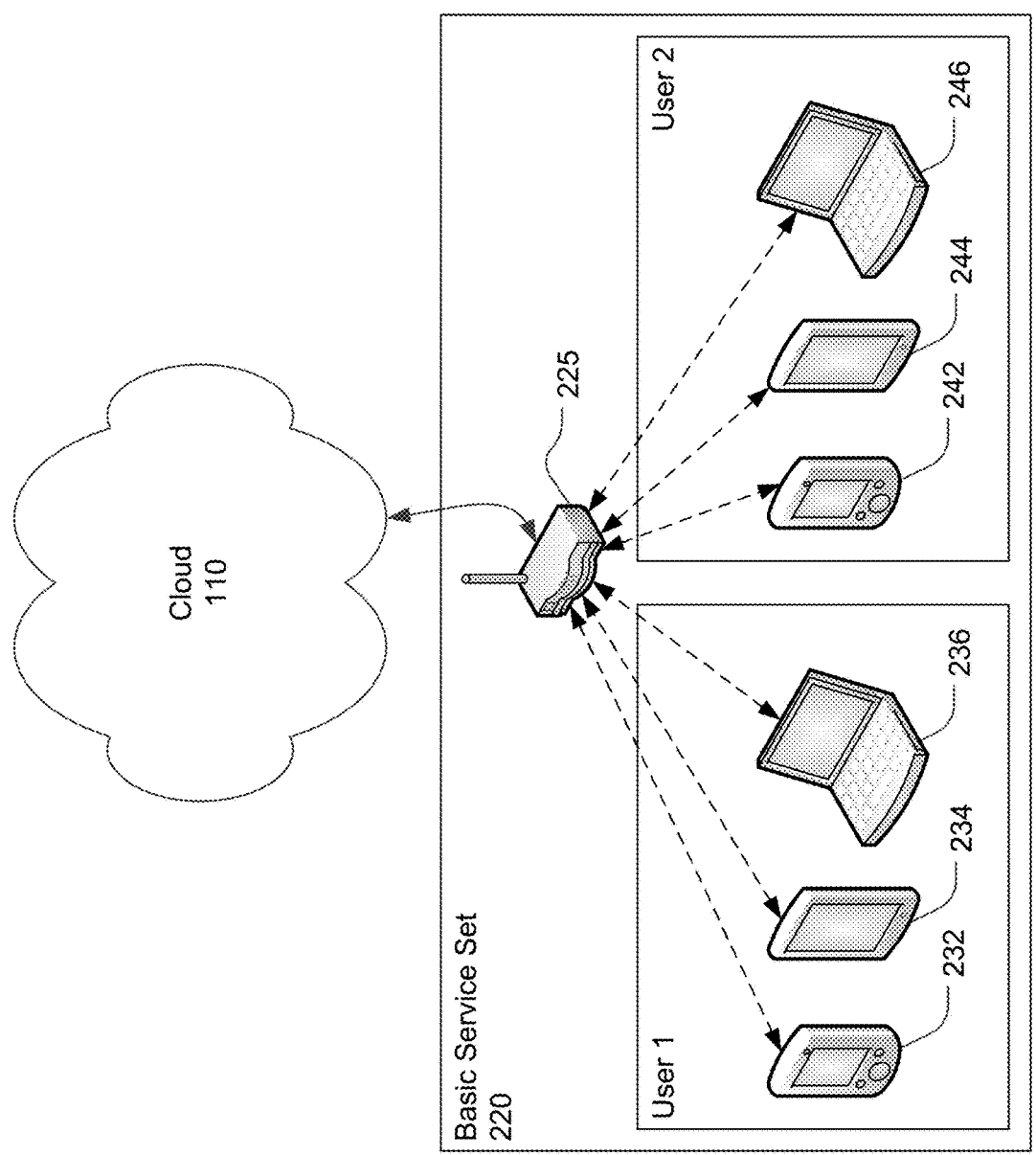
FIG. 2 is a block diagram of a wireless network Basic Service Set shared by two users.
Figure 3:
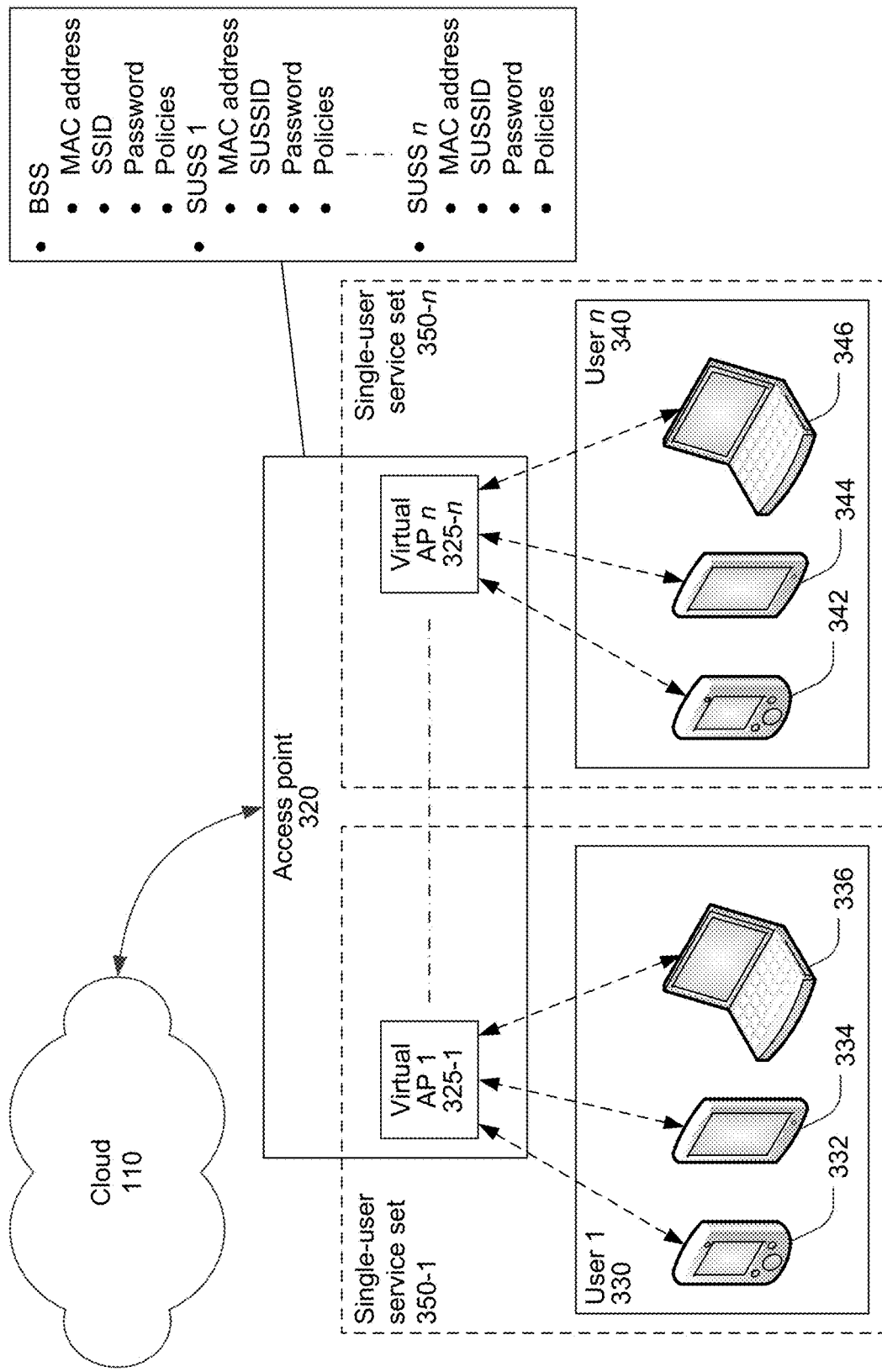
FIG. 3 is a block diagram of a wireless network system providing multiple single-user wireless networks from a single access point.

FIG. 3 is a block diagram of a wireless network system in which multiple single-user wireless networks are provided by a single access point 320. In this document, the terms "single-user wireless network" and "single-user service set" mean a wireless network and a service set, respectively, that connect an access point and devices belonging to a single user or user group. A user group is a group of two or more people who have agreed to share a single user wireless network. A user group may be, for example, members of a family, members of a study group at a university, or members of a project team within a company. The access point in a single-user service set will typically be unaware if the other devices belong to a single user or a user group. Most password-protected home wireless networks are "single-user" service sets consisting of an access point (typically a wireless router) and one or more user devices.

The access point 320 may be capable of supporting a conventional basic service set having a basic service set identifier, a password/encryption key, and policies as previously described. Additionally, the access point 320 may be configured to host multiple virtual access points 325-1 to 325-n, where n is an integer greater than 1. n may be, for example, 8 or 16 or some other integer greater than 1. A "virtual access point", similar to a "virtual server" is not a distinct device. Instead, a "virtual access point", like a "virtual server" shares hardware and software with other virtual access points.

Each of the multiple virtual access points 325-1 to 325-n may have a respective unique MAC address. Each of the multiple virtual access points 325-1 to 325-n may support one or more single-user service sets (SUSS) 350-1 to 350-n. Each of the single-user service sets 350-1 to 350-n may have a respective single-user service set identifier (SUSSID), a respective password/encryption key, and optional policies.

As will be described further in the Description of Processes section below, a single-user wireless network may be initiated by the user, by an administrator computing device (not shown) external to the access point 320, or by a computing device within the cloud 110.

For example, a first user device may be joined to the BSS provided by the access point 320. Optionally, the first user may be required to authenticate themselves before joining the BSS or before being allowed to request formation of a single-user service set. The authentication may be, for example, by ways of a shared password to the BSS, by way of a RADIUS server, or in some other manner. Once authentication, if required, is completed, the user may request, via an application or web browser installed on the first user device, formation of a single-user service set. The user request to form a single-user service set may be received by an application hosted on the access point 320 or within the cloud 110. If the access point 320 can support the request, the user may then upload, via the first user device, a single-user service set identifier, a password, and optional policies for the requested single-user service set. The first user device and additional user devices may then join the single-user service set when established. Each additional device would be required to provide the appropriate single-user service set identifier and password before being allowed to join the single-user service set.

Alternatively, the single-user service set identifier, the password, and optional policies for a desired single-user service set may be downloaded to the access point 320 from an administrator computing device (not shown) or from the cloud such that the single-user service set can be set up in anticipation of a user request. In this case, each user device would be required to provide the appropriate single-user service set identifier and password before being allowed to join the single-user service set.

Each of the single-user service sets 350-1 to 350-n may have a corresponding group temporal key that is known only to the user or user group associated with the single user service set. Traffic, including broadcast traffic, between devices in a particular single-user service set cannot be intercepted by user devices within other service sets hosted by the same access point.

Figure 4:
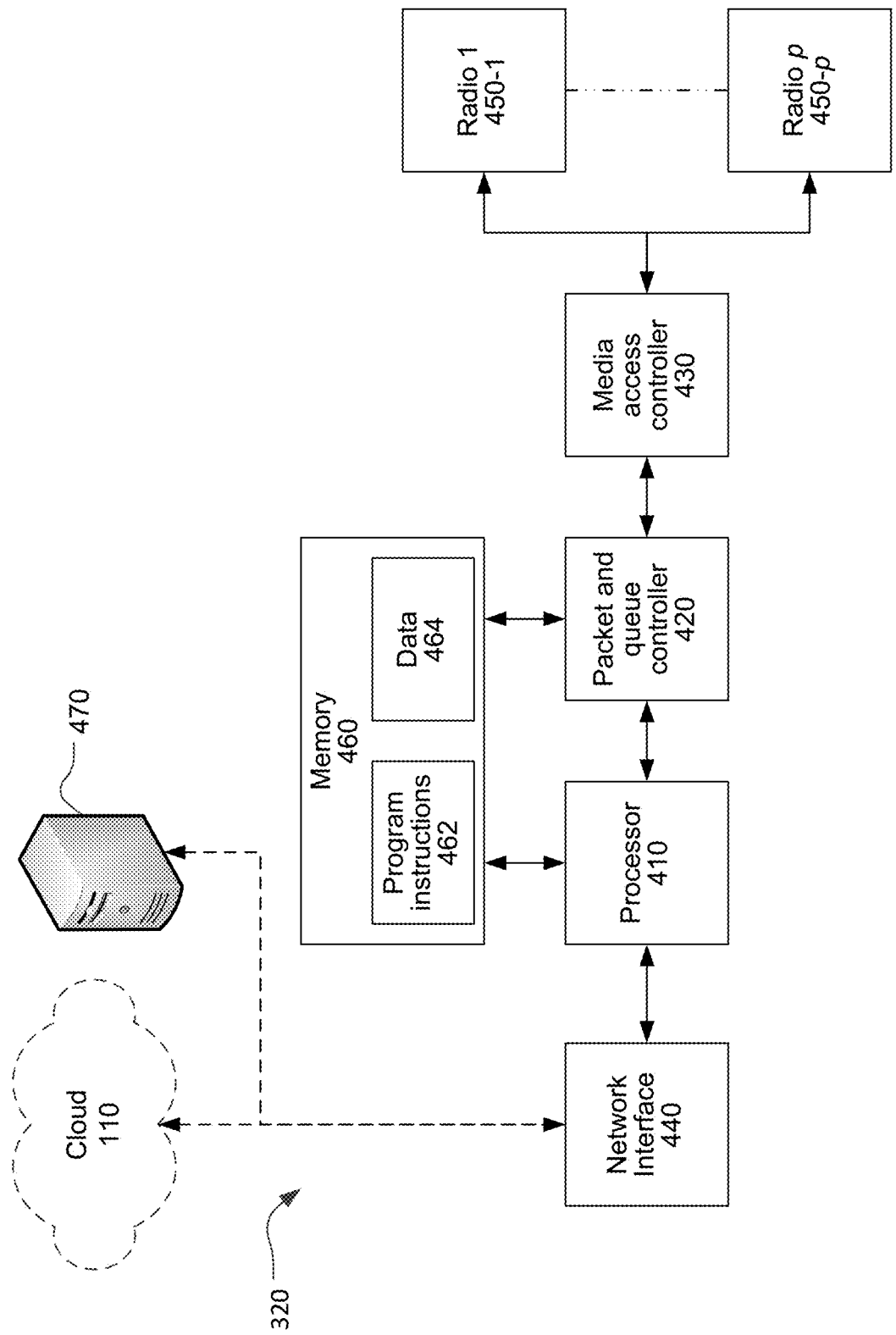
FIG. 4 is a block diagram of an access point.

FIG. 4 is a block diagram of the access point 320 shown in FIG. 3. The access point 320 may include a processor 410, a packet and queue controller 420, a memory 460 coupled to the processor 410 and the packet and queue controller 420, a media access controller 430, a network interface 440, and one or more radios 450-1 to 450-p, where p is a positive integer. p may be, for example, 1, 2, 8 or some other number of radios.

The processor 410 provides computing resources to the access point 320. The processor 410 may be any suitable custom or commercial microprocessor, microcontroller, computing chip or other type of processor. The access point 320 may also include supporting circuitry (not shown) for the processor 410 such as clock circuitry, I/O ports, a direct memory access controller, and other supporting circuitry. The processor 410 may also manage a bus system for communicating with its support circuitry and with the packet and queue controller 420, cloud interface 460 and media access controller 430. An optional security co-processor (not shown) may also be included in the access point 320.

The memory 460 may include one or more of read-only memory, random-access memory, flash memory, and programmable read-only memory. The memory 460 may store program instructions 462 for execution by the processor. The memory 460 may store data used by the access point 320, such as transmitter and receiver queues managed by the packet and queue controller 420.

The network interface 440 includes input/output circuitry for communicating over a data network which may be or include the Internet. The network interface 440 may be used to communicate with the cloud 110. Alternatively, or additionally, the network interface 440 may be used to communicate with an administrator computing device 470 via a local area network. The network interface 440 preferably allows for the highest possible speed connection. For example, the network interface 460 may include a 10 Mbs (megabits per second), 100 Mbs, 1 Gbs (gigabits per second), 2.5 Gbs, 5 Gbs or 10 Gbs Ethernet interface. The network interface 440 may include multiple interfaces with failover support between interfaces.

The packet and queue controller 420 may manage receiver and transmitter queues in the memory 415, perform DMA functions, resolve fragmentation, and perform packet translation.

The media access controller 430 may provide all IEEE 802.11 MAC services for the radios 450-1 to 450-p. The media access controller 430 may provide 802.11 MAC services for multiple virtual access points for each radio. The media access controller 430 may provide 802.11 MAC services for a predetermined number of virtual access points for each radio 450-1 to 450-p. The media access controller 430 may provide 802.11 MAC services for a predetermined total number of virtual access points which may be allocated to the radios 450-1 to 450-p on an as-needed basis. The media access controller 430 may include an interface for exchanging frames and other data with the radios 450-1 to 450-p. Both the packet and queue controller 420 and the media access controller 430 may be implemented by software running on a suitable processor, by one or more application specific integrated circuits (ASIC), by one or more field programmable gate arrays, or by combinations thereof.

Each radio 450-1 to 450-p may include baseband and radio-frequency circuits required to transmit and receive frames. For example, each radio 450-1 to 450-p may include transmitter and receiver radio-frequency circuits, a signal processor, a baseband processor, an interface for exchanging frames and other data with the media access controller 430, and other circuits.

Figure 5:
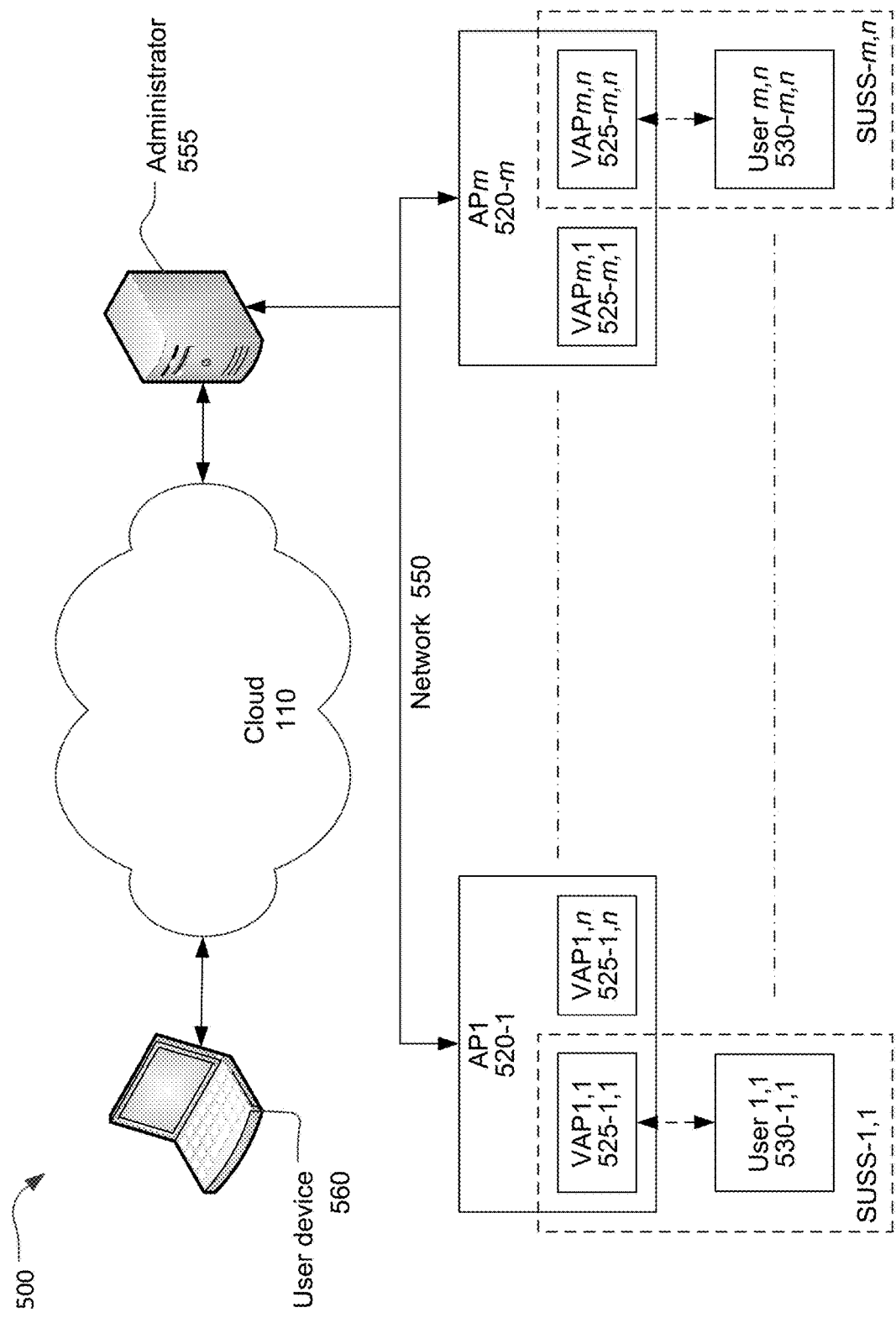
FIG. 5 is a block diagram of a communications system.

FIG. 5 is a block diagram of a communications system 500 including m access points 520-1 to 520-m, where m is a positive integer, an administrator computing device 555, the cloud 110, and a user device 560. The administrator computing device 555 may be collocated with the access points 520-1 to 520-m. The functions of the administrative computing device may be performed in the cloud 110, in which case the administrator computing device 555 may not exist as a separate device. The administrative computing device 555 may be distributed, with some functions performed by a computer collocated with the access points and other function provided by the cloud. In applications where the administrator computing device 555 is collocated with the access points 520-1 to 520-m, the access points 520-1 to 520-m may be in communications with the administrator computing device 555 via a network 550, which may be a local area network, a wide area network that may be or include the Internet, or some other network.

Each access point 520-1 to 520-m may have a capacity to provide n virtual access points. For example, access point 520-1 can provide virtual access points 525-1,1 to 525-1,n. Access point 520-m can provide virtual access points 525-m,1 to 525-m,n. Each virtual access point 525-1,1 to 525-m,n may support one or more single-user service sets. For example, virtual access point 525-1,1 and user devices 530-1,1 constitute single-user service set 1,1. Virtual access point 525-m,n and user devices 530-m,n constitute single-user service set m,n.

The access points 520-1 to 520-m and, optionally, the administrator computing device 555 may be deployed in a complex, where "complex" means "a structure or group of structures housing related units," as is, for example, "a housing complex" or "an office complex". The "complex" is not limited specifically to one or more buildings, but may also be, for example, a ship. Each user 530-1,1 to 530-m,n may be disposed at a different location within the complex. For example, the complex may be a housing complex such as a hotel, motel, inn, cruise ship, dormitory, barracks, or other housing facility remote from a user's home location. In this case, each user 530-1,1 to 530-m,n may occupy or share a respective room within the complex, and each access point 510-1 to 520-m may provide a basic service set with a coverage area extending over a block of rooms. In this case, each access point 510-1 to 520-m may have the capability to provide one or more unique single-user service sets for each of the rooms covered by the respective basic service set.

Other examples of complexes include industrial facilities, schools, hospitals, military bases, and office buildings. Each access point 510-1 to 520-m may provide a basic service set with a coverage area extending over a portion of the complex.

The administrator computing device 555 may perform tasks required to manage wireless communications within the complex. These tasks may include assigning radio-frequency channels and power levels to the radios within the access points 520-1 to 520-m, setting policies regarding traffic types and limits, and collecting billing information in situations where users are charged for use of wireless communications. The administrator computing device 555 may also commission and set up single-user service sets and decommission single-user service sets.

Each single-user service set 530-1,1 to 530-m,n could be assigned a single-user service set identifier and password by an administrator of the system 500. The single-user service set identifier and password may be downloaded to the appropriate access point 520-1 to 520-n from the administrator computing device 555 or the cloud 110. A user, upon checking in to the hotel, could be given the appropriate single-user service set identifier and password for the room the user will occupy. The user could then manually enter the single-user service set identifier and password into each of his user devices. However, having to manually enter the single-user service set identifier and password into each user device is inconvenient for the user, with the level of inconvenience increasing with the number of user devices.

Owners of multiple devices such as smart phones; tablet, lap-top, and desk-top computers; peripheral devices such as printers and scanners; and entertainment devices such as video players, cable or satellite boxes, and televisions commonly establish home wireless networks to link their device. When temporarily located at a complex remote from their home (e.g. while traveling or working), such users may want to interconnect two or more of these devices via a wireless network.

It would be far more convenient for the user if the single-user service set identifier and password at the temporary location were already known to each of the user's devices. In this case, the user would have to upload the known single-user service set identifier and password to the access point once, rather than having to load a new single-user service set identifier and password into each of the user's devices.

One way to accomplish this objective would be to allow the user to set the single-user service set identifier and password at the temporary location to match the service set identifier and password for the user's home wireless network (if the user was willing to share the SSID and password for their home network). Alternatively, a user could, at their leisure, enter a "travel" SSID and password in each device for use only when remote from their home. The travel SSID and password could then be uploaded to the access point and used as the single-user service set identifier and password at the temporary location. In either case, the single-user service set identifier and password for the temporary location would already be present in each of the user's user devices such that the user devices can automatically join the single-user service set.

To set up a single-user service set with a single-user service set identifier and password that are already present in the user's devices (e.g. either their home network SSID and password or their travel" SSID and password), the user must provide the single-user service set identifier and password to the appropriate access point. For example, upon arriving at a temporary location (e.g. upon checking into a hotel room), a user may request formation of a single-user service set. This request may be made, for example, using an application or web browser installed on a first user device. If the access point 520-1 to 502-m can support the request, the user may then upload, via the first user device, the single-user service set identifier, the password/encryption key, and optional policies for the requested single-user service set. The first user device and additional user devices may join the single-user service set when established.

Alternatively, and even more conveniently, the user may provide the single-user service set identifier and password for a desired single-user service set before the user arrives at the temporary location. For example, the user (or the user's travel agent) may use a web browser or other application running on a user device 560 to access a reservation server within the cloud 110. When making a reservation for a hotel room for a future date, the user may be provided an option to enter configuration information including a single-user service set identifier and a password for a desired single-user service set. The configuration may optionally include user policies for the desired single-user service set which may be entered or selected by the user. This configuration information may be transmitted from the cloud 110 to the administrator computing device 555, which may be within the cloud or located at the hotel where the user will stay. When the user is assigned a particular room (either before or upon check-in), the administrator computing device 555 may transmit the configuration information to the appropriate one of the access points 520-1 to 520-m. The access point may then establish a single-user service set using the configuration information provided by the user.

The single-user service set may be decommissioned upon request of the user, after a predetermined period of time, or upon occurrence of some event (i.e. when the user checks out of a hotel).

In a situation where the user is traveling to multiple temporary locations, the process of commissioning and decommissioning a single-user service set may be repeated at each location. For example, if the user is a member of a frequent traveler program or other affinity group for a hotel or hotel chain, the user's preferred single-user service set identifier and password may be stored in the cloud 110 and automatically provided to the administrator computing device at any hotel visited by the user.

Figure 6:
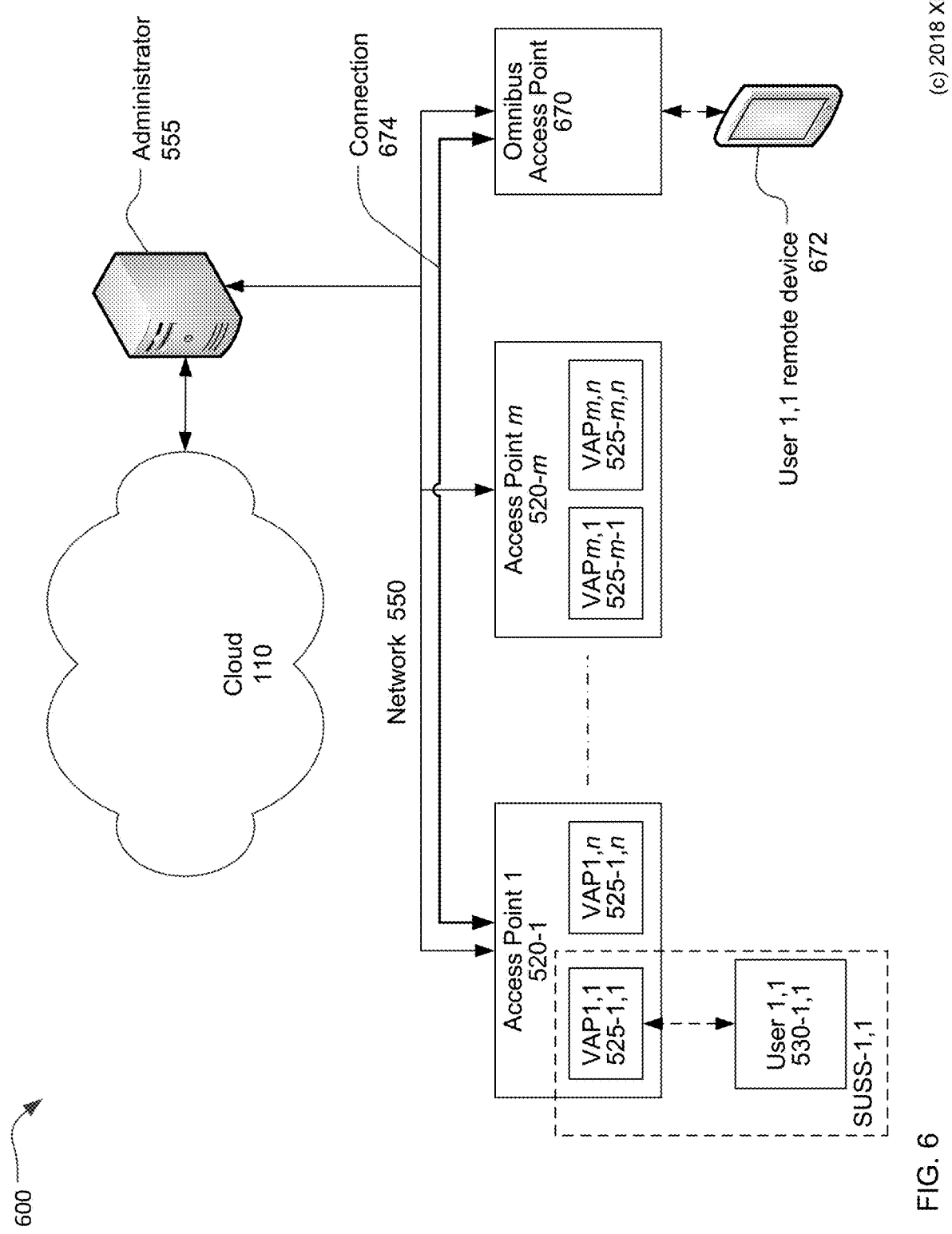
FIG. 6 is a block diagram of a communications system including an omnibus access point.

FIG. 6 is a block diagram of another communications system 600 including m access points 520-1 to 520-m, where m is a positive integer, an administrator computing device 555 (which may be collocated with the access points, contained within the cloud, or distributed), and the cloud 110. These elements are essentially the same as the corresponding elements in FIG. 5. The descriptions of these elements will not be repeated. For sake of discussion, it is again assumed that the communications system 600 is deployed in a hotel as previously defined. The communications system 600 may be deployed in a complex as previously defined.

The communications system 600 also includes an omnibus access point 670 and a remote device 672. When used as an adjective, the word "omnibus" means "of, relating to, or providing many things or classes at once." An omnibus access point provides, or attempts to provide, user devices with access to service sets hosted by other access points (i.e. service sets of which the omnibus access point is not a member). Specifically, the omnibus access point 670 has the capability of providing access to some or all of the single-user service sets within the communications system 600 at once. A coverage area of the omnibus access point 670 may be, for example, a public area of the complex which is not served by any of the virtual access points 525-1,1 to 525-m,n. For example, the coverage area of the omnibus access point 670 may be a patio, a swimming pool area, a restaurant, a lobby, or another public area. Although a single omnibus access point 670 is shown in FIG. 6, a communication system may have more than one omnibus access point. The omnibus access point 670 may also provide a public basic service set open to any device within its coverage area. The omnibus access point 670 may be similar to the access point 320 shown in FIG. 4, with the addition of software instructions that, when executed, perform the functions of the omnibus access point.

As shown in FIG. 6, a remote device 672 belonging to user 1,1 may broadcast a request to join single-user service set 1,1 (SUSS-1,1) in order to communicate with other devices belonging to user 1,1. The omnibus access point 670 may be configured to receive this request and establish a connection 674 between the omnibus access point 670 and access point 1 520-1. The connection 674 between the omnibus access point 670 and access point 1 520-1 may be a connection via the local area network 550 using a tunneling protocol such as L2TP (Layer 2 Tunneling Protocol) or GRE (Generic routing Encapsulation). The connection 674 between the omnibus access point 670 and access point 1 520-1 may be a connection via the local area network 550 using a suitable secure communications protocol such as IPsec (Internet Protocol Security), SSL (Secure Sockets Layer), or TLS (Transport Layer Security). The connection 674 between the omnibus access point 670 and access point 1 520-1 may be a connection via the local area network 550 using some other secure or non-secure tunneling protocol. The remote device 672 may communicate with the devices in single-user service set 1,1 via the connection 674. Thus, the remote device 672 may be effectively joined to the single-user service set established for user 1,1. The remote device 672 may also communicate with a second remote device (not shown) belonging to the same user if the second remote device is connected to the same omnibus access point or a different omnibus access point.

Description of Processes

Figure 7:
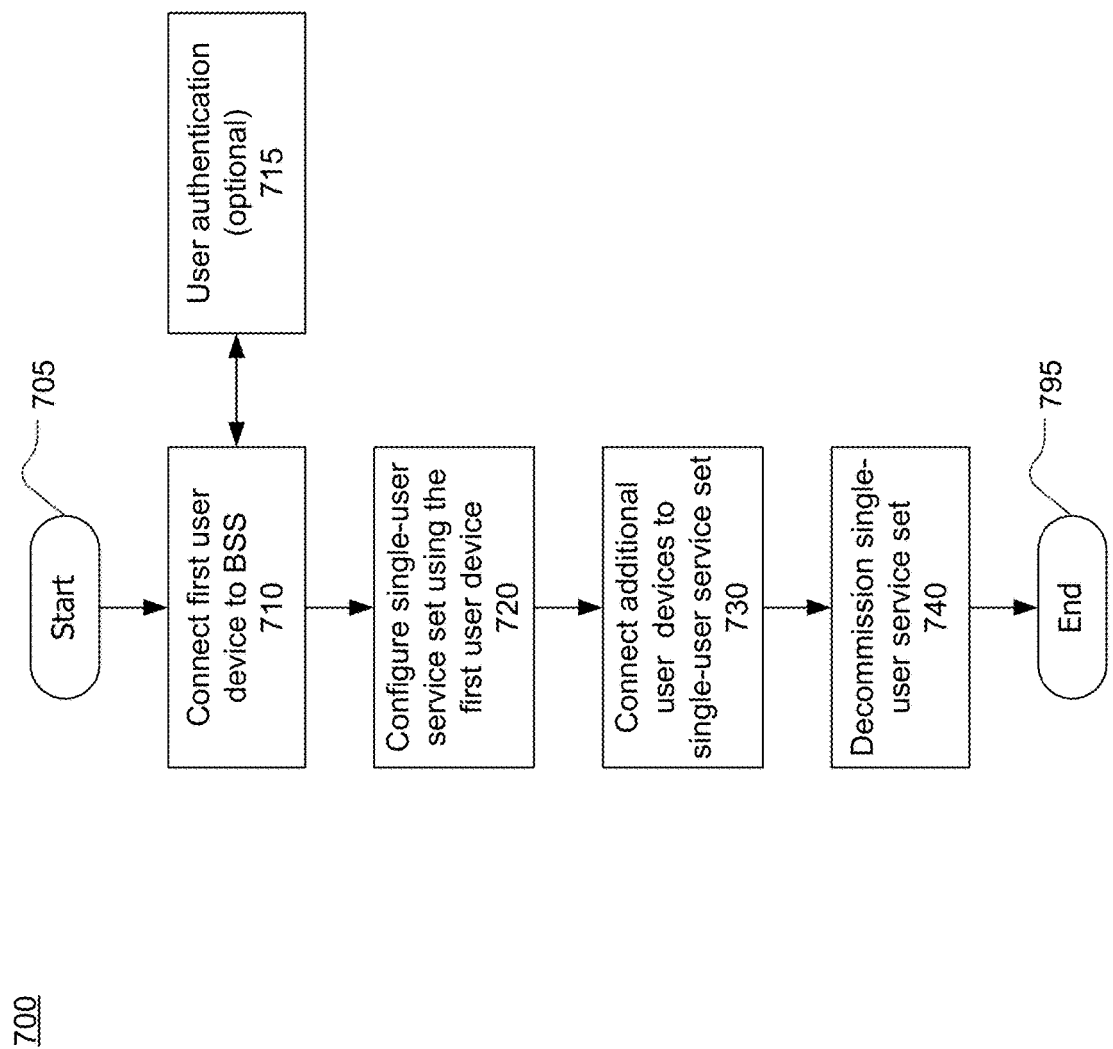
FIG. 7 is a flow chart of a method for creating a single-user wireless network.

Referring now to FIG. 7, a process for managing a single-user service set starts at 705 and ends at 795. A 710, a user may connect a first user device to a basic service set. The first user device may be, for example, a smart phone or a tablet computer or some other device. The basic service set may be a Wi-Fi basic service set provided by an access point remote from the user's home location.

Optionally, at 715, the user may be required to authenticate themselves as part of joining the BSS at 710 or before being allowed to request formation of a single-user service set at 720. The authentication may be, for example, by ways of a shared password to the BSS, by way of a RADIUS server, or in some other manner.

At 720, the user may configure a single-user service set using the first user device. For example, the user may run an application installed on the first user device to configure the single-user service set. Alternatively, the user may use a browser running on the first user device to access a web page to configure the single-user service set. The user may configure the single-user service set in some other manner. In any case, the first user device may provide configuration information including a single-user service set identifier, a password, and optional policies to the access point. To avoid the need to manually enter configuration information in user devices, the user may configure the single-user service set with a service set identifier and password that are already known to the user devices, such as the service set identifier and password of the user's home network.

Once the single-user service set is established, additional user devices may be connected to the single user service set at 730. For example, the user may configured the single-user service set at 720 using the service set identifier and password for the user's home wireless network. In this case, the additional user devices may automatically connect to the configured single-user service set. These user devices may then communicate with each other and/or with the cloud via the single user service set.

The single-user service set may be decommissioned at 740 and the process 700 may end at 795. The single-user service set may be decommissioned at 740 upon request from the user, after a predetermined period of time, or upon some other event (such as the user checking out of a hotel).

Figure 8:
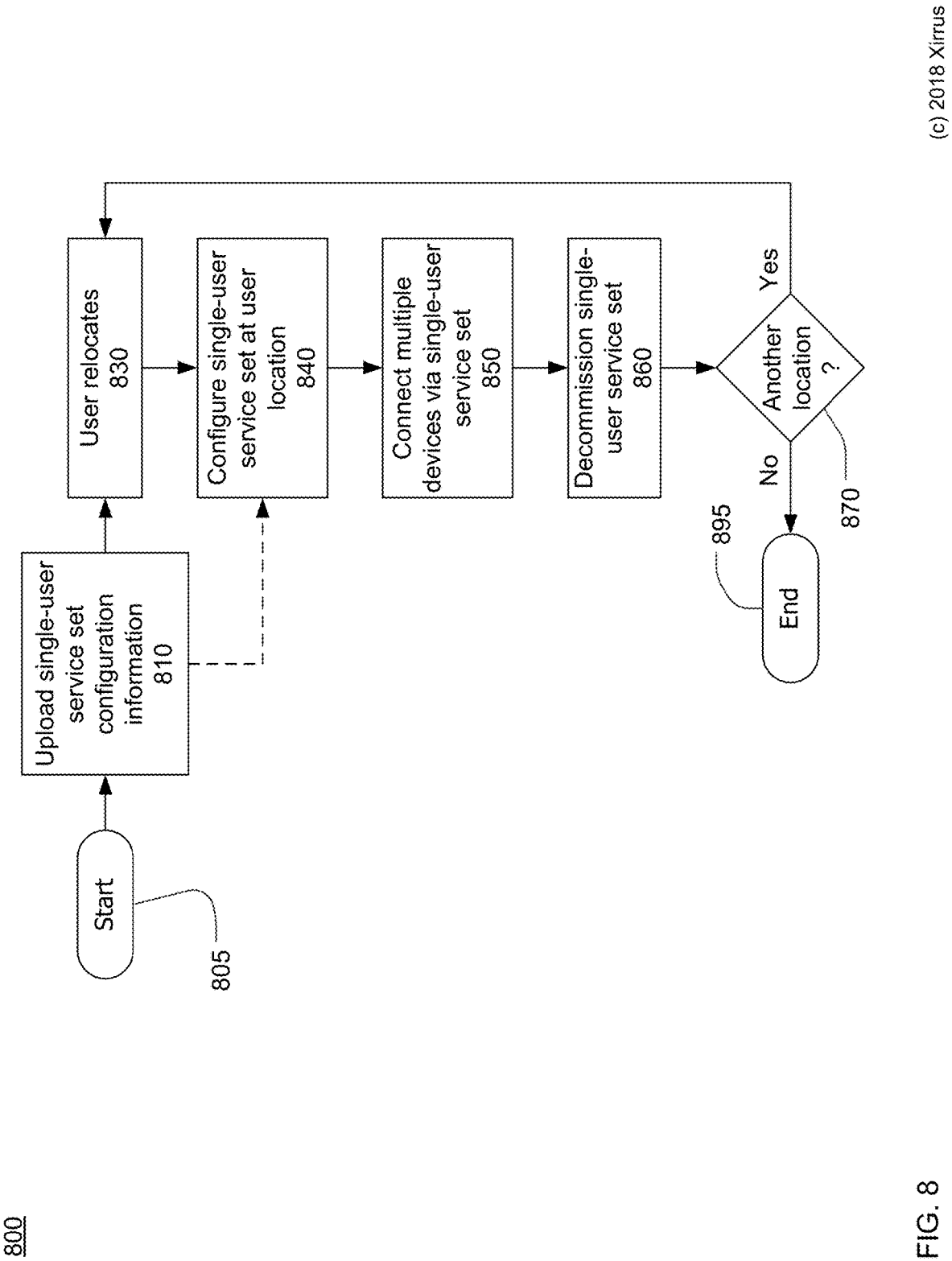
FIG. 8 is a flow chart of another method for creating a single-user wireless network.

Referring now to FIG. 8, another process for managing a single-user service set starts at 805 and ends at 895. At 810, a user may upload configuration information for a single-user service set. The configuration information may include a single-user service set identifier, a password, and optional policies. To avoid the need to manually enter configuration information in user devices, the user may upload a service set identifier and password that are already known to the user's devices, such as the service set identifier and password of the user's home network.

For example, at 810, the user may employ a web browser running on a user device (such as the user device 560) to access a web site provided by a server (such as the server 565). The web site may be a site for making future hotel reservations. The web site may be associated with a particular hotel or hotel chain, or may be a web site of a web-based travel agency. The user may upload the configuration information as part of making a future hotel room reservation. The web site may be a site of a loyalty or affinity program (such as a frequency guest or frequent traveler program) associated with a hotel or hotel chain, or travel agency. In this case, the user may upload the configuration information as part of enrolling in the affinity program. Alternatively, at 810, the user may employ an application installed on a user device, such as a smart phone, to upload the configuration information to a reservations server or affinity program server. In any case, the uploaded configuration information may be stored by the server in anticipation of future use by the user.

At 830, the user may occupy a previously reserved hotel room or otherwise arrive at a location where a single-user service set is desired. At 840, a single user service set may be configured at the user's new location using the configuration information (single user service set identifier, password, and optional polices) that were uploaded and stored at 810. To this end, the server may download the configuration information to a virtual access point at the user's new location, either directly or via an administrator computing device such as the administrator computing device 555. The single user service set may be configured at 840 upon the user's arrival at the new location, or in advance of the user's arrival. In either case, the configuration of the single-user service set may require no further action on the part of the user.

At 850, multiple user devices may be connected to the single-user service set configured at 840. When the configuration information for the single-user service set includes a service set identifier and a password that are already known to the user devices, the user devices may connect to the single-user service set automatically on power-up without any action by the user. Once connected, the multiple user devices communicate with each other and/or with the cloud via the single-user service set.

The single-user service set may be decommissioned at 860 upon request from the user, after a predetermined period of time, or upon some other event (such as the user checking out of the hotel). A determination may be made at 870 whether or not the user is traveling to another location where a single-user service set is desired. When the user is traveling to another location, the process 800 may repeat from 830. When the user is not traveling to another location where a single-user service set is desired (e.g. when the user is returning home), the process 800 may end at 895.

Figure 9:
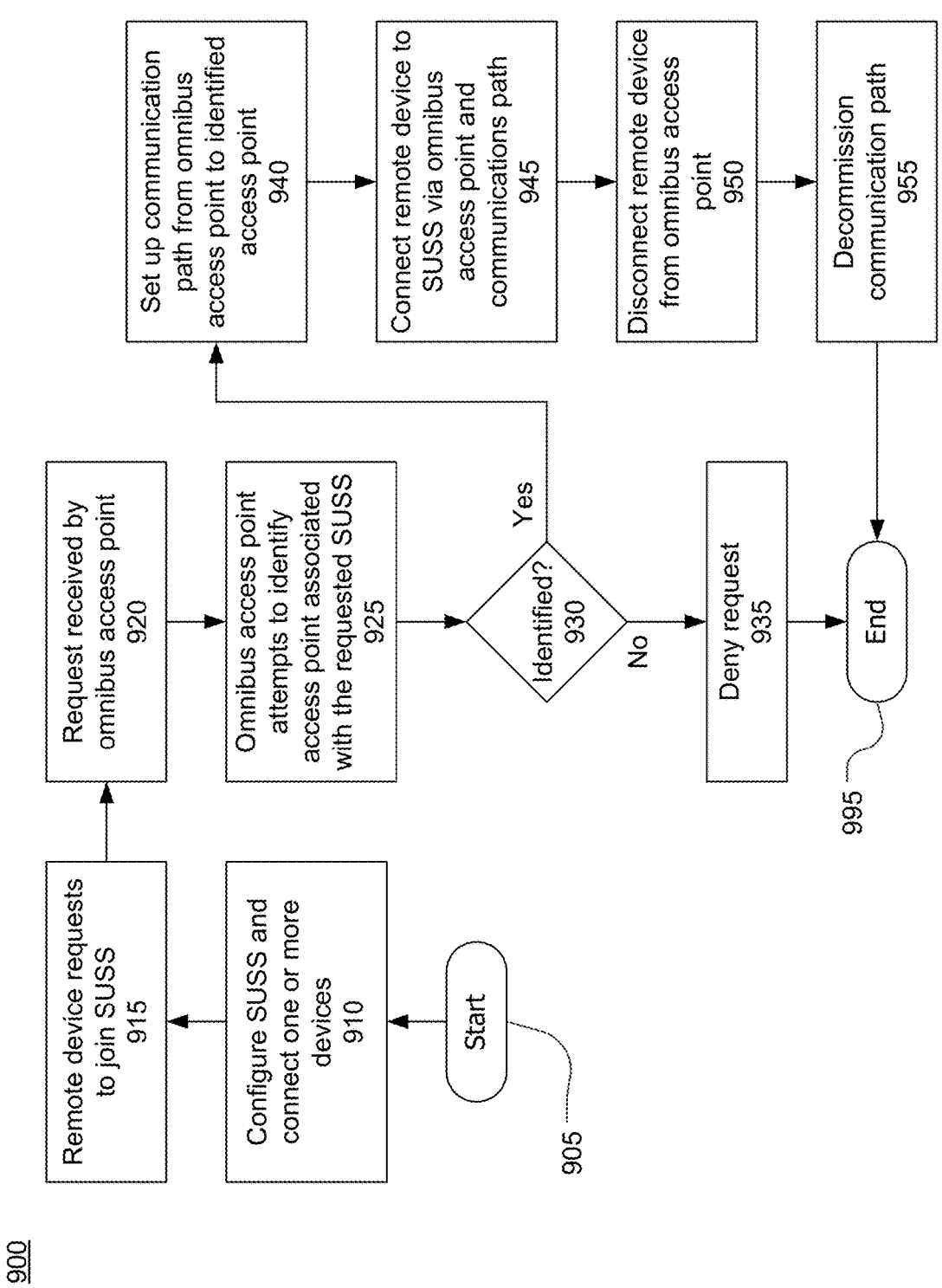
FIG. 9 is a flow chart of a method for connecting a remote device to a single-user wireless network through an omnibus access point.

Referring now to FIG. 9, a process 900 for joining a remote device to a single-user service set may start at 905 and end at 995. At 910, a single-user service set may be configured and one or more user devices may be connected to the single-user service set. The single-user service set may be configured and the one or more user devices may be connected using actions 710 to 730 of the process 700 or actions 810 to 850 of the process 800. The single-user service set may be configured and the one or more user devices may be connected in some other manner. The single-user service set may include a virtual access point, such as virtual access point 525-1,1, hosted by an access point, such as access point 520-1.

At 915, a remote device, such as the remote device 672, may broadcast a request to join the single-user service set. In this context, a "remote" device is a user device located outside of the coverage area of the single-user service set that the user device wants to join. The request may include a single-user service set identifier for the single-user service set that the remote device wants to join.

This request broadcast at 915 may be received by an omnibus access point, such as the omnibus access point 670, at 920. As previous described, an omnibus access point is an access point that provides, or attempts to provide, user devices with access to service sets hosted by other access points (i.e. service sets of which the omnibus access point is not a member). A coverage area of the omnibus access point may be in a public area that is not served by the requested single-user service set. For example, the coverage area of the omnibus access point may be a patio, a swimming pool area, a restaurant, a lobby, or another public area. The omnibus access point may be connected with one or more access points, such as access point 520-1 to 520-m, via a local area network such as the local area network 550. The omnibus access point may be connected with an administrator computing device, such as the administrator computing device 555, via the local area network or by means of a direct communications path.

At 925, the omnibus access point may attempt to identify an access point associated with the requested single user service set, which is to say the access point that hosts the virtual access point included in the requested single user service set. In theory, the omnibus access point may be able to identify the access point associated with the requested single user service set anywhere within the cloud. In practice, the omnibus access point may limit its search for the access point associated with the requested single user service set to devices connected with the omnibus access point via the local area network.

For example, the omnibus access point may send a query (Do you host this single-user service set?) to each access point connected to the local area network. In this case, each access point may provide a response indicating whether or not the access point is associated with the requested single user service set.

The omnibus access point may broadcast a query (Does anyone host this single-user service set?) to all of the devices connected to the local area network. In this case, the omnibus access point may receive a response from the access point associated with the requested single user service set. The absence of any response indicates the requested single user service set is not associated with any access point connected to the local area network.

An administrator computing device connected to the local area network may maintain a table of all active single-user services sets associated with access points connected to the local area network. In this case, the omnibus access point may send a query (Who hosts this single-user service set?) to the administrator computing device. The administrator computing device may respond by identifying the access point associated with the requested single user service set. Alternatively, The administrator computing device may respond indicating that the requested single user service set is not associated with any access point connected to the local area network.

At 930, a determination may be made whether or not an access point associated with the requested single user service set has been identified. When an access point associated with the requested single user service set has not been identified ("no" at 930), a message denying the request may be sent to the remote device at 935 and the process 900 may end at 995.

When the access point associated with the requested single user service set has been identified ("yes" at 930), a communications connection between the omnibus access point and the access point associated with the single-user service set may be set up at 940. The connection between the omnibus access point and the access point associated with the single-user service set may use any suitable secure or non-secure tunneling protocol as previously described. At 945, the remote device may by connected to, and communication with, the requested single-user service set via the omnibus access point, the communications connection, and the access point associated with the requested single-user service set.

At 950, the remote device may be disconnected from the omnibus access point. The remote device may be disconnected by an action of the user of the remote device, by moving the remote device out of the coverage area of the omnibus access point, or in some other manner. Upon disconnection of the remote device at 950, the communications connection between the omnibus access point and the access point associated with the single-user service set may be decommissioned at 955, and the process 900 may end at 995.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for managing a communications system including a wireless network access point and an administrator computing device coupled by a network, comprising:
    connecting a first user device to a basic service set hosted by the access point;

accepting, at the administrator computing device, a request to configure a single-user service set hosted by the access point, wherein
the request is received from the first user device via the basic service set and the network, and
the request includes configuration information for the single-user service set;
the administrator computing device instructing the access point to configure the single-user service set using the configuration information; and
the access point configuring the single-user service set using the configuration information.

2. The method of claim 1, wherein the request is submitted using a software application on the user device.

3. The method of claim 1, wherein the request is submitted via a web page accessed using a web browser on the user device.

4. The method of claim 1, further comprising:
connecting the first user device to the single-user service set.

5. The method of claim 4, further comprising:
connecting at least one additional user device to the single-user service set.

6. The method of claim 1, wherein
the configuration information comprises a single-user service set identifier and a password.

7. The method of claim 1, wherein instructing includes transmitting the configuration information from the administrator computing device to the access point.

8. The method of claim 1, further comprising:
authenticating an identity of a user of the first user device prior to accepting the request to configure a private single-user service set.

9. A communications system, comprising:
an administrator computing device and a wireless network access point connected by a network,
the access point comprising hardware and software to:
host a basic service set, and
host at least one single-user service set configurable in accordance with configuration information provided by the administrative computing device;
the administrator computing device comprising hardware and software to:
accept, from a user device connected to the basic service set, a request to configure the single-user service set hosted by the access point, the request including configuration information for the single-user service set, and
instruct the access point to configure the private single-user service set using the configuration information;
whereby the access point configures the single-user service set using the configuration information.

10. The communication system of claim 9, wherein the request is submitted using a software application on the user device.

11. The communication system of claim 9, wherein the request is submitted via a web page accessed using a web browser on the user device.

12. The communication system of claim 9, wherein
the configuration information comprises a single-user service set identifier and a password.

13. The communication system of claim 9, the administrator computing device further comprising hardware and software to:
transmit the configuration information to the access point.

14. The communication system of claim 9, the administrator computing device further comprising hardware and software to:
authenticate an identity of a user of the user device prior to accepting the request to configure a single-user service set.

15. The communication system of claim 9, the access point further comprising hardware and software to:
authenticate an identity of a user of the user device prior to connecting the user device to the basic service set.

16. A communications system, comprising:
an administrator computing device and a wireless network access point connected by a network,
the access point comprising hardware and software to concurrently host a basic service set and at least first and second single-user service sets configurable in accordance with configuration information provided by the administrative computing device;
the administrator computing device comprising hardware and software to:
accept, from a first user device connected to the basic service set, a first request to configure the first single-user service set hosted by the access point, the request including first configuration information,
accept, from a second user device connected to the basic service set, a second request to configure the second single-user service set hosted by the access point, the request including second configuration information, and
instruct the access point to configure the first and second single-user service sets using the respective first and second configuration information;
whereby the access point configures the first and second single-user service sets using the respective first and second configuration information.

17. The communication system of claim 16, wherein each of the first and second requests is submitted via one of a software application on the user device and a web page accessed with a web browser on the user device.

18. The communication system of claim 16, wherein
each of the first and second configuration information comprises a respective single-user service set identifier and a respective password.

19. The communication system of claim 16, the administrator computing device further comprising hardware and software to:
authenticate identities of users of the first and second user devices prior to accepting the respective first and second requests.

20. The communication system of claim 16, the access point further comprising hardware and software to:
authenticate identities of users of the first and second user devices prior to connecting the first and second user devices to the basic service set.

* * * * *